United States Patent [19]

Eckels

[11] Patent Number: 4,518,885
[45] Date of Patent: May 21, 1985

[54] SUPERCONDUCTING ROTOR WITH VAPOR COOLED CRYOGENIC LEADS HAVING A REGENERATOR PORTION

[75] Inventor: Phillip W. Eckels, Penn Hills, Pa.

[73] Assignee: Electric Power Research Institute, Inc., Palo Alto, Calif.

[21] Appl. No.: 571,263

[22] Filed: Jan. 16, 1984

[51] Int. Cl.³ .............................................. H02K 9/16
[52] U.S. Cl. ........................................ 310/52; 62/505; 310/60 A; 310/61
[58] Field of Search .................. 62/55, 505; 310/52, 310/54, 55, 58, 60 A, 61, 64, 65, 260, 60 R

[56] References Cited

U.S. PATENT DOCUMENTS

| | | | |
|---|---|---|---|
| 3,043,901 | 7/1962 | Gerwing et al. | 310/61 |
| 3,476,961 | 11/1969 | Heard et al. | 310/58 |
| 3,731,865 | 5/1973 | Wood | 310/54 |
| 3,778,649 | 12/1973 | Lehuen et al. | 310/61 |
| 3,809,933 | 5/1974 | Sugawara et al. | 310/52 |
| 4,091,298 | 5/1978 | Gamble | 310/52 |
| 4,389,585 | 6/1983 | Yamaguchi et al. | 310/52 |

Primary Examiner—R. J. Hickey
Assistant Examiner—D. L. Rebsch
Attorney, Agent, or Firm—G. H. Telfer

[57] ABSTRACT

Vapor cooled leads to superconductive windings of a superconducting rotor are made more faultworthy by a regenerator portion of the conductive leads, through which the exiting vapor passes and is warmed so that, under fault conditions, the vapor does not cause icing of collector rings or damage to seals proximate the vapor return path.

3 Claims, 4 Drawing Figures

SUPERCONDUCTING ROTOR WITH VAPOR COOLED CRYOGENIC LEADS HAVING A REGENERATOR PORTION

BACKGROUND AND SUMMARY OF THE INVENTION

This invention relates to electrical machines and more particularly to those having a superconducting winding on the rotor cooled by a cryogenic liquid coolant, such as helium, which becomes a vapor in the operation of the machine.

Superconducting generators of early design were not capable of remaining superconducting throughout the uncleared fault (short circuit) interval required in modern power grid systems. Present estimates of the required faultworthiness of a superconducting generator to provide power system stability range up to about 15 or more cycles (¼ second or more) of critical fault clearing time. During a fault, heat is generated in the rotor's cold electromagnetic shield and superconducting winding which may produce a pressure rise in the rotor of about 3 to 4 atmospheres. Vapor cooled leads, such as those of Gamble Pat. No. 4,091,298, May 23, 1978, carry current from the warm collector ring (or other external current source) to the cryogenic zone with a low amount of heat leakage, because cold vapor produced in the rotor flows counter to the direction of heat flow from room temperature. Such leads are thus designed to take care of the required external connections to the superconducting winding and also the needs for vapor removal from the liquid cooled rotor. Under steady state conditions, the vapor pressure drop from the cold end to the warm end of the lead may be only about 0.1 atmosphere and the cold end heat leak approximately 1.2 W/K Amp for each lead, with about 1 cm$^2$/K Amp of copper area of the conductor over its length.

When a fault occurs and rotor vapor pressure necessarily rises, cold vapor flow through the lead from the rotor increases in response to the increased pressure differential, causing a surge in vapor flow. The surge flow causes the smallish copper area lead and helium outlet temperature to drop very rapidly. The flow can be reduced to some extent by using an outlet orifice at approximately room temperature. Simple orifices do not control the excess flow well because the density of the surge vapor stream increases with temperature drop and mass flow is proportional to the square root of pressure difference and density. Without adequate control of the flow, the surge stream can cause icing of the collector rings and chilling of the rotating seals below their operating temperature limit, which leads to failure. It is with the objective of insuring faultworthiness, while not having to alter presently used arrangements of collector rings and rotating seals, that the present invention came about.

By the present invention, the outlet temperature of the surge stream is controlled at the warm end of the conductive lead by a "regenerator" portion of the lead that warms the surge stream and stabilizes its temperature and density. By the term "regenerator" in this context is meant a thermally massive element that, when required, transfers thermally stored heat to a gas stream in like fashion as a blast furnace regenerator. Stabilizing the density of the vapor therefore stabilizes the mass flow. The regenerator portion of the lead has a thermal mass (equal to its density × its specific heat × the metal volume thereof) that is much larger, preferably about an order of magnitude or more, than the total thermal mass of the surge stream itself (equal to its density × its specific heat × its total volume flow in a fault interval). In addition, the cooling effectiveness of the regenerator portion (equal to its actual heat transfer divided by its maximum theoretical heat transfer) is in excess of 99%. These characteristics of the regenerator are sufficient to assure that the helium return stream is warmed before it returns through the rotating transfer seals.

The design of the regenerator portion may be accomplished by the use of a block of conductive material that has a thermal mass substantially greater than that of the transferred vapor, including that transferred during fault conditions, such as by at least an order of magnitude. This may be accomplished by utilizing as the regenerator portion a bus conductor, such as of copper, of a cross-sectional area of conductive material at least an order of magnitude greater, and an overall volume at least two times greater, than that of the conductive element of the conductor that is at the cold end. For heat transfer between the regenerator portion and the vapor being transferred, the bus conductor includes a plurality of vapor transfer passages within the conductive material.

DESCRIPTION OF THE PREFERRED EMBODIMENTS

Figure 1:
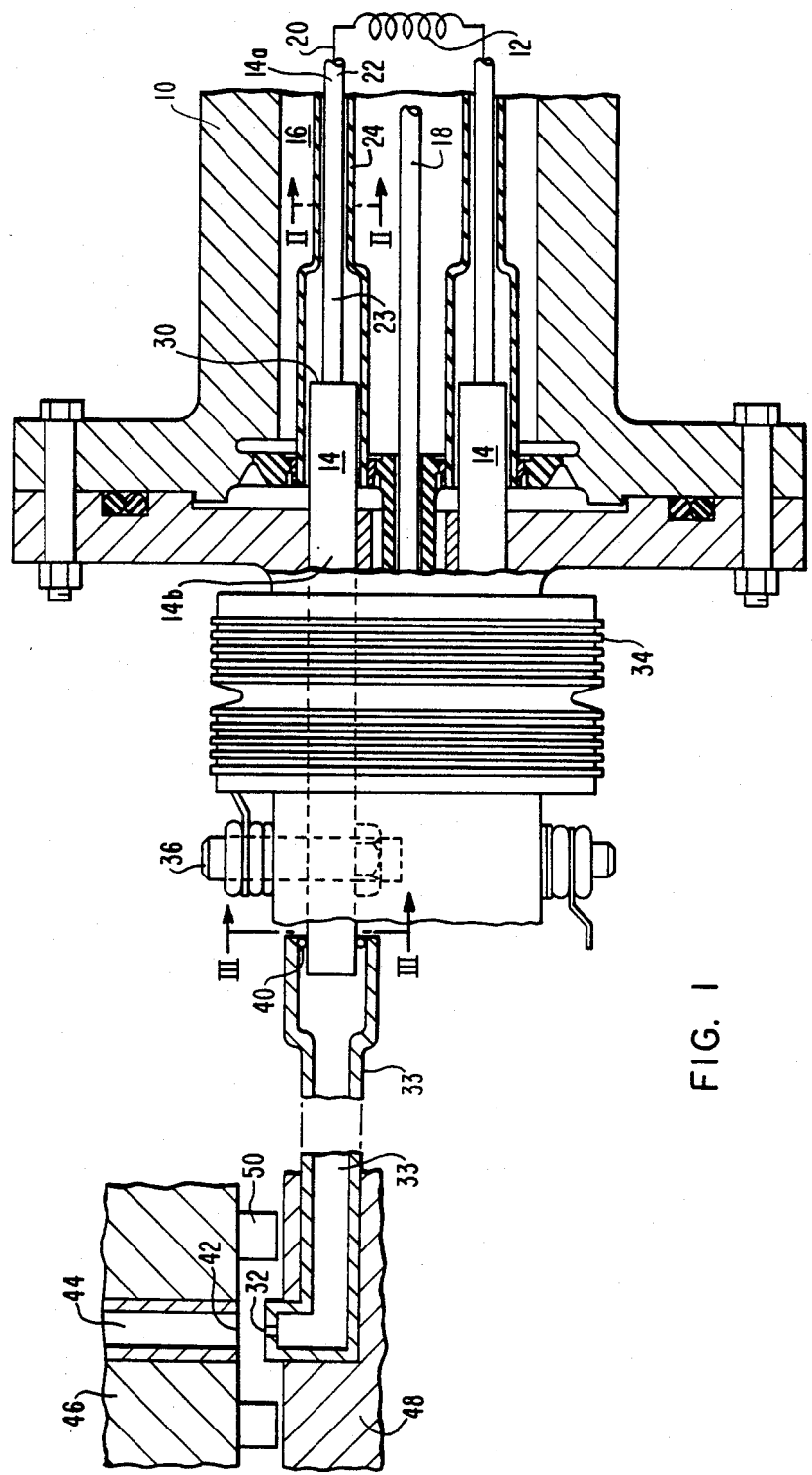
FIG. 1 is a longitudinal view partly in section of a portion of a superconducting rotor embodying the present invention.

FIG. 1 shows the collector end, or nondriven end, of a superconducting rotor 10. This would be, for example, the rotor of an AC generator. The rotor 10 has a cryogenically cooled rotor winding 12, such as a field winding of a generator, schematically shown in this view. Of particular importance to the present invention is the manner and means by which normally conductive (that is, not superconductive) leads 14 communicate between the superconducting winding and the exterior of the rotor and how those conductors are cooled, and particularly at the exterior or warm end of those conductors.

For an example of certain aspects of the construction as to vapor cooling the conductive leads reference is made to Gamble Pat. No. 4,091,298, May 23, 1978, which is herein incorporated by reference. The superconducting winding 12 is in a chamber 16 that has an axial liquid coolant inlet 18 of known type. The superconducting winding 12 is connected to the conductive leads 14 of which the upper one is more completely shown. The cold end connection 20 is not shown in detail. Information relating to a suitable cold end connection 20 may be found in the above-mentioned patent. The general criteria for the cold end connection 20 are that it electrically connects a normal conductor to the superconductors of winding 12 and also that it allows coolant vapor to pass from chamber 16 in intimate contact with the normal conductor out through the lead 14 for cooling the lead and discharging excess vapor from the chamber. For these purposes the inner conductor portion 14a comprises a conductive braid or mesh 22, such as of copper, closely packed within an insulating sheath 23 and a metal sheath 24.

Figure 2:
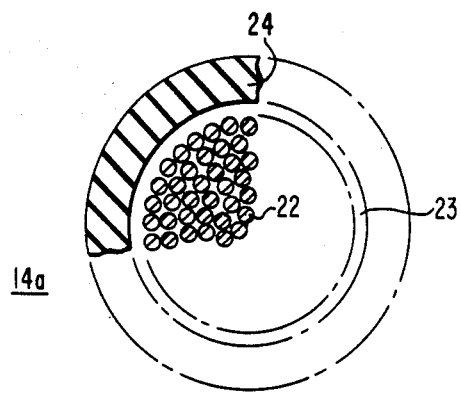
FIGS. 2 and 3 are cross-sectional views of portions of the structure of FIG. 1 taken respectively along lines II—II and III—III.

A cross-section of conductor portion 14a is shown in FIG. 2, which is a section taken along line II—II of FIG. 1. Coolant vapor is allowed to enter the core of braided conductor 22 through apertures (not shown) in the sheaths 23 and 24 proximate the cold end connection 20.

Figure 3:
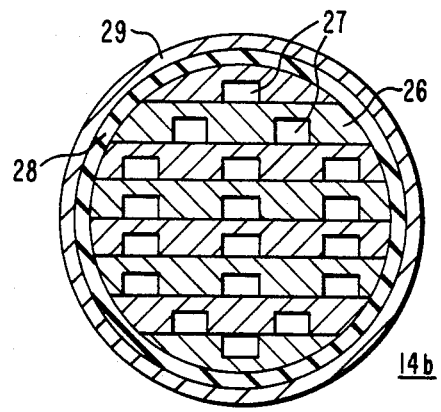

A second, outer, portion 14b of the conductor 14 extends from the outer end of the inner portion 14a, proximate the axial extreme of chamber 16, to a point removed from chamber 16. The portion 14b is a conductive bus and serves as the room temperature regenerator of the structure. As shown in the cross-section of FIG. 3, taken along line III—III of FIG. 1, the conductor 14b comprises solid conductive material 26 with apertures 27 through which the vapor from the interior of the machine passes to an ultimate exit that is then returned to a compressor for refrigeration or reliquifaction. Insulation 28 and an outer metal sheath 29 may be used on conductor 14b. It is preferred that the conductive portions 26 of the conductor be of copper although other materials may be used. To fabricate conductor 14b, individual pieces of copper 26 have grooves 27 machined into adjacent surfaces. This avoids the difficulty of drilling holes through a length of copper. The individual pieces 26 are then brazed together, whereby the grooves become apertures 27. Strands of the braid 22 are brazed to the conductor 26 at the joint 30.

For a better understanding of the invention, some specific lead design parameters are given in the following table, by way of example:

TABLE

| | |
|---|---|
| Total length of conductor 14 | 2.13 m. |
| Length of inner conductor 14a | 1.55 m. |
| Length of outer conductor 14b | 0.58 m. |
| Cross-sectional area of 14a braid 22 | 1.5 cm$^2$ |
| Cross-sectional area of 14b conductor 26 | 16.0 cm$^2$ |
| Total volume of 14a braid 22 | 232 cm.$^3$ |
| Total volume of 14b conductor 26 | 928 cm.$^3$ |
| Material of braid 22 | 30 AWG strand Cu |
| Material of conductor 26 | Cu bar stock |
| Cooling channels in 14a | 45% void |
| Cooling channels in 14b | 16 0.318 cm. sq. channels |
| Current Conducted | |
| Steady State | 1450 amperes |
| Forcing | 1800 amperes |

As can be seen from the table, each lead 14, in this example, has 2.13 meters of conductive length with 1.55 meters of welding cable or braid 22 connected to 0.58 meter of heavy bar 14b at the warm of collector end. These elements have respective cross-sectional areas of 1.5 square centimeters and 16 square centimeters. Having a small diameter lead 14a at the cold end minimizes manufacturing problems, reduces the fault helium surge and provides additional temperature margin in the event of a loss of coolant.

Figure 4:
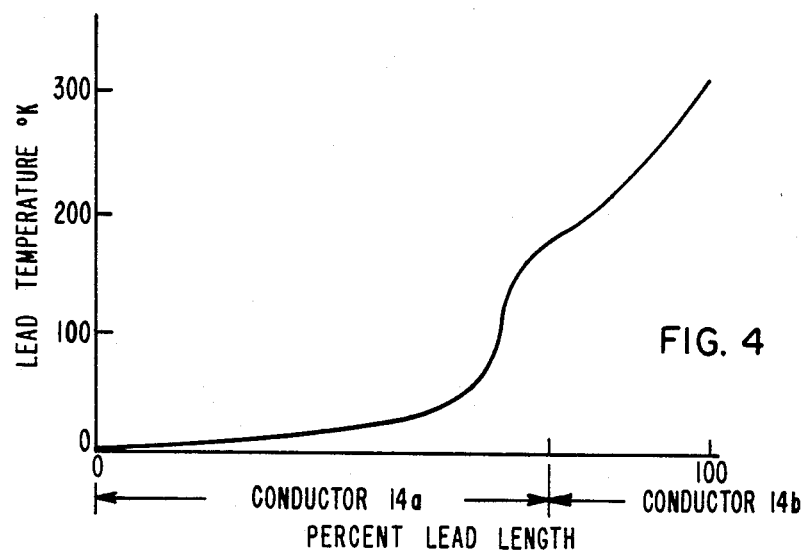
FIG. 4 is a graph of performance data related to the use of the present invention.

The effect is seen in FIG. 4, where the small area lead 14a has a maximum temperature of about 175° K. Also seen in this Figure is how the large thermal mass of conductor portion 14b can warm the helium before its passage through the outlet flow control orifice 32 which is located beyond the end of conductor 14b at the end of the gas discharge duct 33 and is at the surface of the rotating structure. The orifice, in this design, is located inside the rotating transfer system so that its diameter can be changed without major rotor modifications. The orifice pressure drop in steady flow, in this example, is equal in pressure drop to the 51 millibar pressure drop in the steady operating lead and is 0.635 cm. in diameter. The large orifice is an advantage for cool down but does permit high surge flow rates. The steady state lead flow rate is 0.082 grams/sec. for each lead and surges to 2.46 grams/sec. during a fault. The heat capacity of the stream is 0.12 kilojoules/°K. sec. which is small compared to the regenerator capacity of 3.2 kilojoules/°K. sec. Thus if the high pressure that occurs on a fault, such as four atmospheres, persists for 5 seconds, the heat required to warm the stream would be 0.6 kilojoules/°K. The warm end passage geometry to achieve an effectiveness of 99% consists, per this example, of sixteen ⅛-inch (about 3.2 mm.) square channels in each lead. Clearly, other geometries, may be used to achieve the required performance.

FIG. 1 shows diagrammatically that orifice 32 communicates with an annular space 42 from which one or more outlet passages 44 extend through the machine's stationary structure 46. Between the rotating structure 48 supporting the gas duct 33 and the stationary structure 46 are vapor seals 50 that are protected from damage due to overcooling by the heat transfer provided to the returning vapor by the conductor portion 14b.

FIG. 1 also shows collector rings 34 connected by a bolt-on type of connector 36 to the bar 14b. It will be appreciated that conductor 14b may extend beyond connector 36 for performance of its heat transfer function although its electrical function only requires conduction to the connector. Connector 36 is protected by the heat transfer in bus 14b from cooling to an extent that could cause icing of the collector rings 34. Also, various seals at the connector 36 (not shown) and an O-ring seal 40 at the joint between conductor 14b and gas duct 33 are protected against degeneration by the regenerator 14b.

It is therefore seen that a lead design arrangement for connecting with superconducting rotor windings is presented that solves the problem of cold gas outrush from the lead during a fault. The use of this invention, including a warm end regenerator portion of the conductor, protects the collector rings and helium transfer system from excessive chilling that could impair their operation.

Other aspects of superconducting rotors to provide faultworthiness and thermodynamic stability have to do with the coolant supply 18 and transfer devices associated therewith; see Eckels copending application Ser. No. 571,261 filed of even date herewith and assigned to the present assignee, for a description.

We claim:
1. A superconducting rotor comprising:
a superconducting rotor winding within a rotatable chamber, means for supplying a liquified coolant to said chamber to cool said rotor winding, one or more normal electrical conductors having a first end connected with said superconducting field winding within said chamber and a second end located external of said chamber for supplying excitation to said winding;
said one or more conductors each having an inner portion comprising a conductive element with vapor transfer passages for transferring out of said chamber vapor generated from coolant therein and for cooling said conductive element by said vapor as it is transferred; and, each of said conductors having a regenerator portion, extending external of said chamber, comprising a conductive member of a thermal mass that is greater than that of said transferred vapor, including that transferred during fault conditions, by at least about an order of magnitude, said conductive member of said regenerator portion having vapor transfer passages communicating with said vapor transfer passages of said conductor inner portion.

2. A superconducting rotor in accordance with claim 1 wherein: said conductive member of said regenerator portion comprises a bus conductor of cross-sectional area of conductive material at least about an order of magnitude greater, and a total volume at least about two times greater, than that of said conductive element of said conductor inner portion that is directly connected to said field winding.

3. A superconducting rotor in accordance with claim 1 wherein: said regenerator portion has an outer end with a seal between it and a stationary return conduit for coolant vapor, and said rotor has a collector ring connected with said bus conductor, said regenerator portion being sufficiently massive to prevent overcooling of said seal and icing of said collector ring under normally expected fault conditions to which said rotor is subject.

* * * * *